(12) United States Patent
Cheng et al.

(10) Patent No.: US 11,462,631 B2
(45) Date of Patent: Oct. 4, 2022

(54) SUBLITHOGRAPHY GATE CUT PHYSICAL UNCLONABLE FUNCTION

(71) Applicant: INTERNATIONAL BUSINESS MACHINES CORPORATION, Armonk, NY (US)

(72) Inventors: Kangguo Cheng, Schenectady, NY (US); Eric Miller, Watervliet, NY (US); Fee Li Lie, Albany, NY (US); Gauri Karve, Cohoes, NY (US); Marc A. Bergendahl, Rensselaer, NY (US); John Ryan Sporre, Albany, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 16/848,451

(22) Filed: Apr. 14, 2020

(65) Prior Publication Data
US 2021/0320190 A1    Oct. 14, 2021

(51) Int. Cl.
| | | |
|---|---|---|
| *H01L 29/66* | (2006.01) | |
| *H01L 29/423* | (2006.01) | |
| *H02M 3/155* | (2006.01) | |
| *H04L 9/32* | (2006.01) | |
| *H01L 29/06* | (2006.01) | |

(Continued)

(52) U.S. Cl.
CPC ........ *H01L 29/66795* (2013.01); *B82Y 10/00* (2013.01); *H01L 29/0673* (2013.01); *H01L 29/42392* (2013.01); *H02M 3/155* (2013.01); *H04L 9/0866* (2013.01); *H04L 9/3278* (2013.01)

(58) Field of Classification Search
CPC .......... H01L 29/66795; H01L 29/0673; H01L 29/42392; H01L 21/823431; H01L 27/0886; B82Y 10/00; H02M 3/155; H04L 9/0866; H04L 9/3278; H04L 2209/122
See application file for complete search history.

(56) References Cited

U.S. PATENT DOCUMENTS 8,759,976 B2    6/2014    Edelstein et al.
9,281,236 B2    3/2016    Feng et al.
(Continued)

OTHER PUBLICATIONS

Faragalla et al., "Impact of Process Variability on FinFET 6T SRAM Cells for Physical Unclonable Functions (PUFs)", 12th International Conference on Computer Engineering and Systems (ICCES 2017). Dec. 19, 2017. pp. 31-36.

(Continued)

*Primary Examiner* — Daniel D Chang
(74) *Attorney, Agent, or Firm* — Tutunjian & Bitetto, P.C.; Randall Bluestone

(57) ABSTRACT

Methods, and devices related to authentication of chips using physical unclonable function (PUF) are disclosed. The semiconductor chip includes a substrate. The semiconductor chip includes multiple devices formed on the substrate. Each device includes multiple fins. A gate is formed on the multiple fins with a gate cut (CT) design that results in random distribution of complete gate cut and incomplete gate cut for each of the multiple devices based on a natural process variation in semiconductor manufacturing for each device. A physical unclonable function (PUF) region is defined in accordance with the random distribution.

20 Claims, 10 Drawing Sheets

(51) Int. Cl.
*H04L 9/08* (2006.01)
*B82Y 10/00* (2011.01)

(56) References Cited

U.S. PATENT DOCUMENTS

| | | |
|---|---|---|
| 9,576,914 B2 | 2/2017 | Li et al. |
| 9,666,582 B1 | 5/2017 | Li et al. |
| 9,991,892 B2 | 6/2018 | Wacquez et al. |
| 10,134,762 B2 | 11/2018 | Cheng et al. |
| 10,229,854 B1 | 3/2019 | Sporre et al. |
| 2014/0042628 A1 | 2/2014 | Edelstein et al. |
| 2016/0300948 A1* | 10/2016 | Yang .................. H01L 27/0924 |
| 2018/0190781 A1* | 7/2018 | Cheng ............. H01L 21/823431 |
| 2018/0233461 A1 | 8/2018 | Okagaki |
| 2021/0028067 A1* | 1/2021 | Jaeger ................ H01L 21/76877 |
| 2021/0320190 A1* | 10/2021 | Cheng ................ H01L 27/0886 |

OTHER PUBLICATIONS

Sreedhar et al., "Physically Unclonable Functions for Embeded Security based on Lithographic Variation", 2011 Design, Automation & Test in Europe. Mar. 14, 2011. pp. 1-6.

* cited by examiner

SUBLITHOGRAPHY GATE CUT PHYSICAL UNCLONABLE FUNCTION

BACKGROUND

The present invention generally relates to physical unclonable functions, and more particularly, to on-chip physical unclonable function generation and management thereof.

In the electronics industry, security in electronic devices has become a major concern of manufacturers and users of such devices. In this regard, it is useful to be able to distinguish each electronic device, especially the integrated circuit (IC) within these devices, from each other. This is particularly true for devices such as computers, personal hand held devices, cellular phones, chip cards, and other devices that have sensitive information.

Physical unclonable function (PUF) is an emerging hardware-based security that has a variety of applications. For example, PUFs can be used to uniquely identify a piece of hardware by providing a unique identifying signal that is difficult to counterfeit. PUFs are unique and generate a highly reproducible output, even with a fuzzy readout.

SUMMARY

In accordance with an embodiment of the present invention, a semiconductor chip has a physical unclonable function (PUF) region. The semiconductor chip includes a substrate. The semiconductor chip includes multiple devices formed on the substrate. Each device includes multiple fins. A gate is formed on the multiple fins with a gate cut (CT) design that results in random distribution of complete gate cut and incomplete gate cut for each of the multiple devices based on a natural process variation in semiconductor manufacturing for each device. A physical unclonable function (PUF) region is defined in accordance with the random distribution.

In accordance with an embodiment of the present invention, a semiconductor chip has a physical unclonable function (PUF) region. The semiconductor chip includes a substrate. The semiconductor chip includes multiple devices formed on the substrate. Each device includes a single fin. A gate is formed on the single fin with a gate cut (CT) design that results in random distribution of complete gate cut and incomplete gate cut for each of the devices based on a natural process variation in semiconductor manufacturing for each device. A physical unclonable function (PUF) region is defined in accordance with the random distribution.

In accordance with an embodiment of the present invention, a method of forming a semiconductor structure with a physical unclonable function (PUF) is provided. The method includes forming a device with multiple fins per bit cell. The method includes forming a gate over the multiple fins. The method also includes forming a source and drain over the multiple fins. The method further includes performing a gate cut process for random complete and incomplete gate cut across each gate across the multiple fins.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention relate generally to a method and structure for forming a chip with a physical unclonable function (PUF) by modulating the continuity and discontinuity of a gate acting on one more fins (which may or may not be merged). The example embodiments can form a security feature on a chip by implementing the techniques described herein (including sub-lithography gate cut), for example, along with the conventional complementary metal oxide (CMOS) processing. Using fin field-effect transistors (FinFETs) as an example, the security circuit can be implemented as an array of FinFETs.

In an example embodiment, the structure includes at least two fins per bit cell and places a gate cut(s) (CT) between those fins. Both fins have shared contacts for source and drain. A gate straps both fins. The gate is cut into two segments. The gate cut is designed such that, depending on the natural process variation in semiconductor manufacturing, the gate cut (randomly for each cell) may or may not be complete. The resulting devices randomly either behave substantially as a device with at least one fin excluded from contributing to the drive current (for example, when the gate cut is complete) or, in contrast, a device with drive current from all fins.

In another example embodiment in accordance with the present invention, the structure includes at least one fin per bit cell. The CT is placed between the fin and gate contact. The gate cut is designed such that, depending on the natural process variation in semiconductor manufacturing, the gate cut (randomly for each cell) may or may not be complete. The resulting devices randomly either behave substantially as a fin device (for example, when the gate cut is incomplete) or, in contrast, a device with no drive current (for example, as an inactive device).

The example embodiments described herein can be implemented in highly scaled transistors such as FinFET, nanowire FET, nanosheet FET, incorporating the processes described herein into forming a chip with a physical unclonable function while printing lines followed by cutting the printed lines into desired segments to overcome the patterning challenges.

Exemplary applications/uses to which the present invention can be applied include, but are not limited to chip security for a variety of applications such as Internet-of-Things (IoT). The example embodiments provide a security feature on chip without adding process cost that can be implemented for a wide variety of electronics, from supercomputers to IoT.

Figure 5:
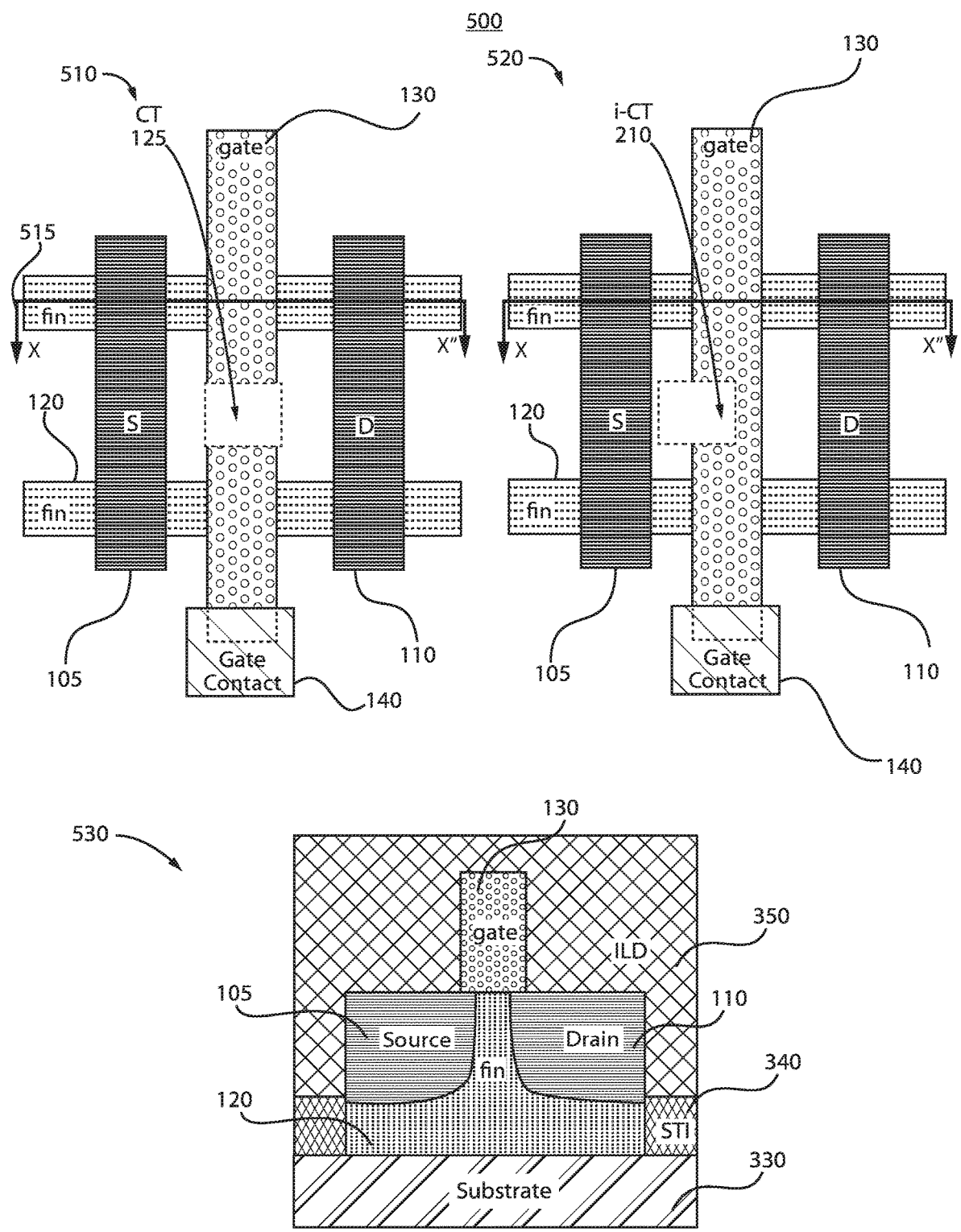
FIG. 5 illustrates top views of a complete CT FinFET (corresponding to, for example, FIG. 1) and an incomplete CT FinFET (corresponding to, for example, FIG. 2) and a cross-sectional view of a gate in either instance, in accordance with an embodiment of the present invention.
Figure 6:
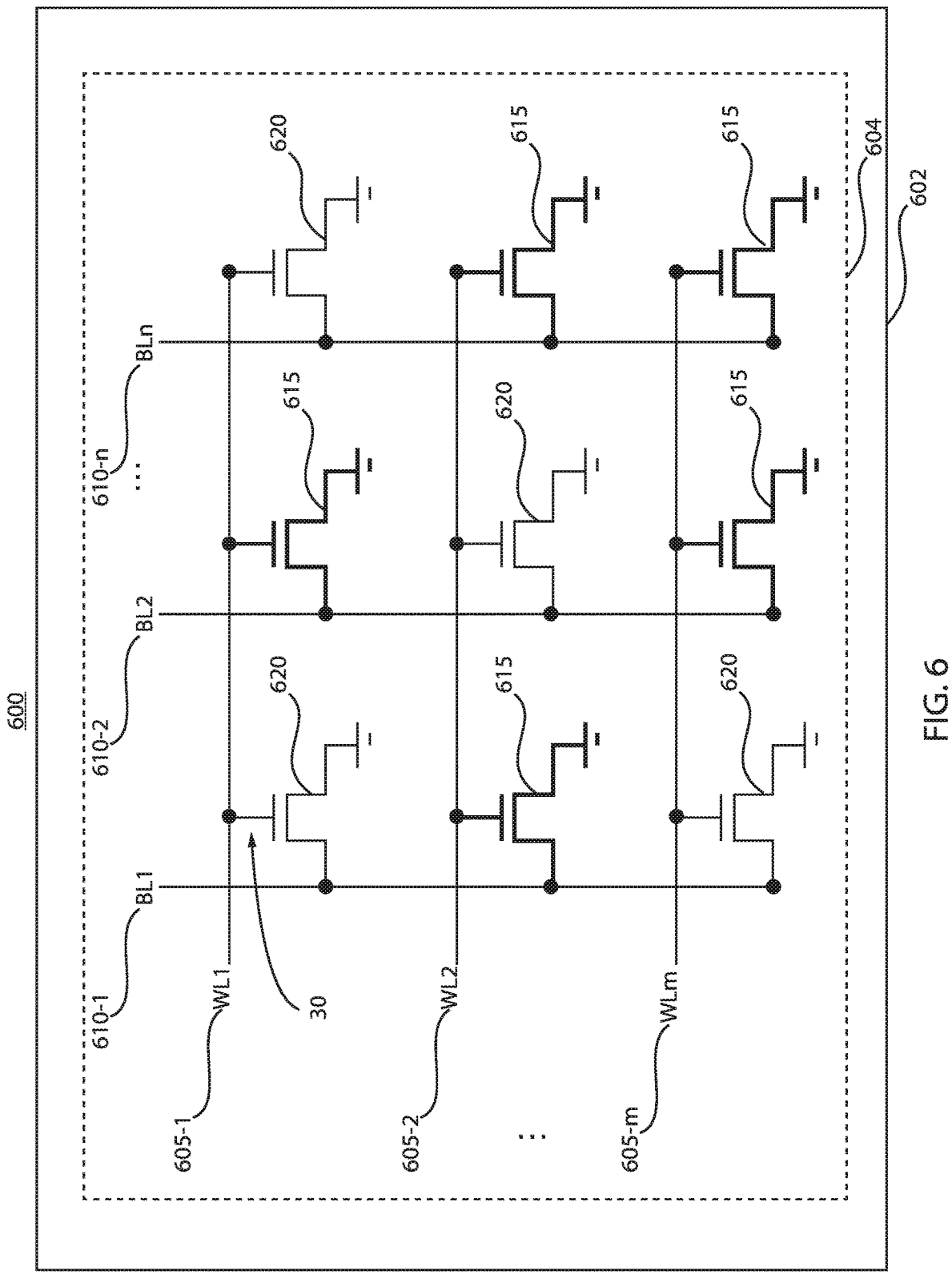
FIG. 6 is a diagram showing an array of fin field-effect transistors (FinFETs) forming a multiple bit security code, in accordance with an embodiment of the present invention.

As described herein below with respect to FIGS. 1 to 6, a semiconductor chip can include a security circuit (for example, semiconductor chip 600 and security circuit 610, as shown in FIG. 6 and described herein below). The security circuit can include an array of FinFETs. Each FinFET comprise at least two fins. A gate straps both fins. The gate is cut into two segments and designed such that, depending on the natural process variation in semiconductor manufacturing, the gate cut may (for example, as shown and described with respect to FIGS. 1, 3, and 5) or may not be complete (for example, as shown and described with respect to FIGS. 2, 4, and 5). Since the process variation is random, by reading the drive current from all FinFETs, a random and unique security code is obtained for reach chip without additional process cost. In one example embodiment, the security code is used as the unique chip identifier.

Figure 2:
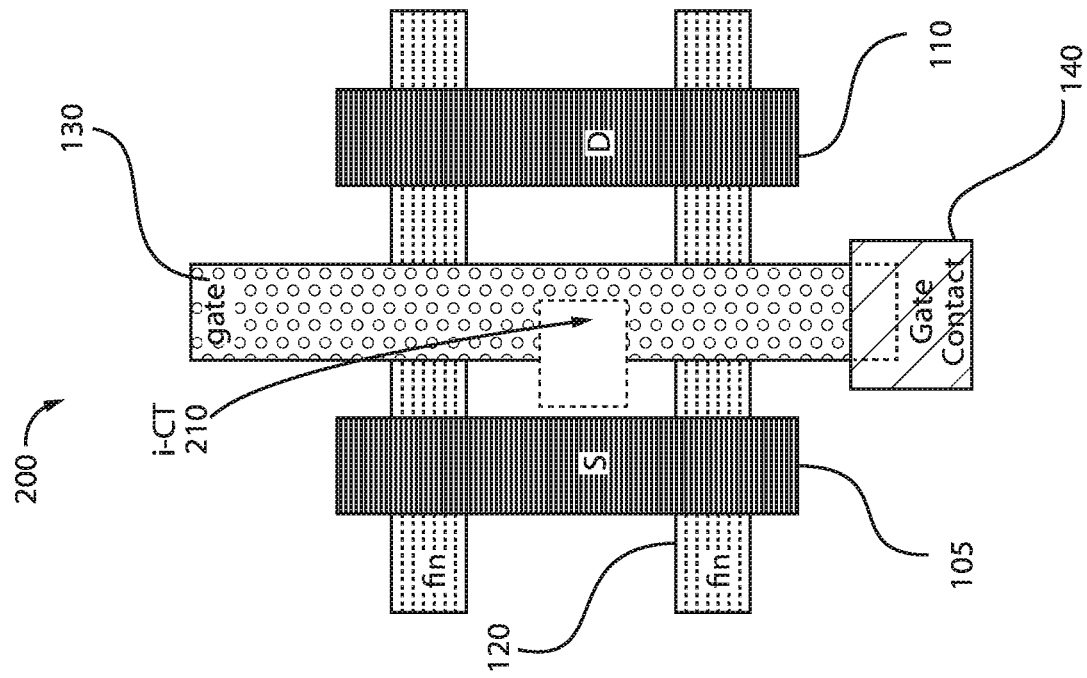
FIG. 2 is a top view showing an incomplete CT FinFET, in accordance with an embodiment of the present invention.
Figure 1:
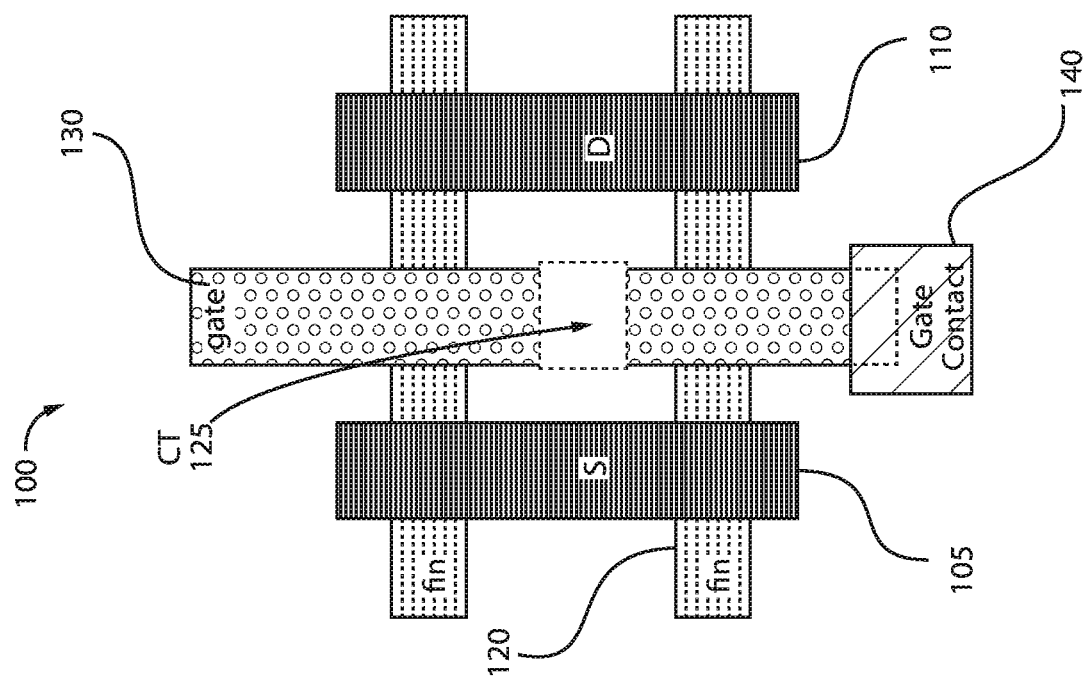
FIG. 1 is a top view showing a complete gate cut (CT) fin field-effect transistor (FinFET), in accordance with an embodiment of the present invention.

Referring now to the drawings in which like numerals represent the same or similar elements and initially to FIGS. 1 and 2, a top view 100 showing a complete CT FinFET is illustrated in FIG. 1 in accordance with example embodiments. A top view 200 showing an incomplete CT FinFET is illustrated in FIG. 2 in accordance with example embodiments.

The FinFETs described herein are fabricated using a gate cut process that randomly produces, depending on natural process variation in semiconductor manufacturing, either a complete or an incomplete gate cut. For example, a gate cut can be determined within a range such that the process variation on the FinFETs randomly produces complete gate cuts or incomplete gate cuts. The gate 130 in the multiple fin device allows effective drive current from each of the fins. The FinFET with a complete gate cut, as shown in FIG. 1, has the effective drive current from a single fin (which can be implemented to represent logic "0"). In contrast, the FinFET with incomplete gate cut, as shown in FIG. 1, has the effective drive current from two fins (which can be implemented to represent logic "1").

As shown in FIG. 1, a gate 130 straps (for example, intersects, is formed on, etc.) a pair of fins 120 (120-1 and 120-2). A gate contact 140 is formed on one end of the gate 130. A source (S) 105 and drain (D) 110 are arranged on the fins 120. Both fins 120 have shared contacts for source 105 and drain 110. The device with the gate 130 that is cut (CT) 125 as shown in FIG. 1 corresponds to Logic "0". Each FinFET includes at least two fins 120. The gate is cut (CT 125, complete, shown in FIG. 1 or incomplete CT 210, an example of which is shown in FIG. 2) into two segments by a complete CT 125. The gate cut for the PUF structure is designed such that, depending on the natural process variation in semiconductor manufacturing (variation in critical dimension (CD), overlay (OL) between CT and gate, and etch variation), the gate cut may (125, FIG. 1) or may not (210, FIG. 2) be complete.

With regard to FIG. 1, devices in the physical unclonable function structure can be implemented to represent logic "0". The process, in this instance, randomly results in a complete gate cut. In this instance, when a gate voltage is applied to the device through gate contact 140, the gate voltage does not pass to the gate of top fin due to complete gate cut. The top fin is always off resulting in an inactive (for example, 'dead', inoperative, etc.) FET. Consequently, the top fin does not contribute to the drive current of the device 100. Although the device 100 has two fins, the device behaves like a single fin device. In other words, the device 100 in FIG. 1 has a lower drive current than device 200 in FIG. 2.

Referring now to FIG. 2, a top view 200 of a CT-fin with an incomplete gate cut is shown.

As shown in FIG. 2, a gate 130 intersects with a pair of fins 120 (120-1 and 120-2). A source (S) 105 and drain (D) 110 are arranged on the fins 120. The gate 130 has an incomplete gate cut (CT) 210 that corresponds to Logic "1". In this instance, the gate cut process results in an incomplete gate cut.

With regard to FIG. 2, devices in the physical unclonable function structure can be implemented to represent logic "1". The process, in this instance, randomly results in an incomplete gate cut. In this instance, the gate 130 around channels of all fins can receive gate voltage through gate contact 140. As a result, the device 200 in FIG. 2 has a higher drive current than device 100 in FIG. 1.

In accordance with example embodiments, a FinFET with complete gate cut (for example, devices as shown in FIG. 1) has effective drive current from a portion of fins but not all fins (for example, with a value read as corresponding to logic "0"). In contrast, a FinFET with incomplete gate cut (for example, devices as shown in FIG. 1) has effective drive current from all fins (for example, with a value read as corresponding to logic "1"). Since the process variation is random, by reading the drive current from all FinFETs in the security array (as further described with respect to FIG. 6, herein below), a random and unique security code is obtained for each chip without additional process cost. In one embodiment, the security code is used as the unique chip identifier.

The example embodiments achieve physically unclonable electrical structures by a process that modulates the continuity and discontinuity of a gate acting on multiple fins. This is achieved through special gate cut (CT) designs that are implemented at the boundary of normal fabrication variation (for example, a point at which the result cannot be predicted between a complete gate cut and incomplete gate cut) such that the process results in random complete (for example, FIG. 1) and incomplete gate cut (for example, FIG. 2) at the device level (not at, for example, a BEOL interconnect level).

The example embodiments provide a method and structure for forming PUF on a chip by implementing a CT technique to stochastically (for example, by implementing a process with random results) determine the effective device performance along with a FinFET process. This is implemented with a special gate cut (CT) design that pushes the boundary of normal fabrication variation such that it results in random complete (as shown in FIG. 1) and incomplete gate cut (as shown, by way of example, in FIG. 2) at the device control level (and not at a channel level). For example, the gate cut process, including mark placement, can be determined in a manner that allows random incomplete and complete gate cuts throughout multiple devices.

As used herein, the term "source", for example source (S) 105, is a doped region in the semiconductor device, in which electrical carriers (for example, electrons or holes) are flowing into the channel. As used herein, the term "drain", for example drain (D) 110, means a doped region in semiconductor device located at the end of the channel, in which carriers are flowing out of the transistor through the drain. The "channel" is the region of the underlying the gate structure and between the source 105 and drain 110 of a semiconductor device that becomes conductive when the semiconductor device is turned on. In example embodiments, to provide source 105 and drain 110 region structures, the epitaxial material can be doped to an n-type or p-type conductivity.

As used herein, "semiconductor device" refers to an electronic device that includes a semiconductor material. A field effect transistor (FET) is a semiconductor device in which output current, e.g., source-drain current, is controlled by the voltage applied to a gate structure to the semiconductor device. A field effect transistor can have three terminals, e.g., gate structure, source region and drain region. A finFET is a semiconductor device that positions the channel region of the semiconductor device in a fin structure. A FinFET is a multiple-gate device, for example, a MOSFET (metal-oxide-semiconductor field-effect transistor), built on a substrate where the gate 130 is placed on two, three, or four sides of the channel or wrapped around the channel, forming a double gate structure. The source 105/drain 110 region forms fins on the surface. As used herein, a "fin structure", for example fin 120, refers to a semiconductor material, which is employed as the body of a semiconductor device, in which the gate structure is positioned around the fin structure such that charge flows along the channel on the two sidewalls of the fin structure and optionally along the top surface of the fin structure.

The example embodiments achieve physically unclonable electrical structures by modulating the continuity and discontinuity of a gate 130 acting on multiple fins 120. The processes described randomize the gate cut in a manner that produces either complete gate cut (as shown in FIG. 1) or incomplete gate cut (as shown in FIG. 2).

Figure 3:
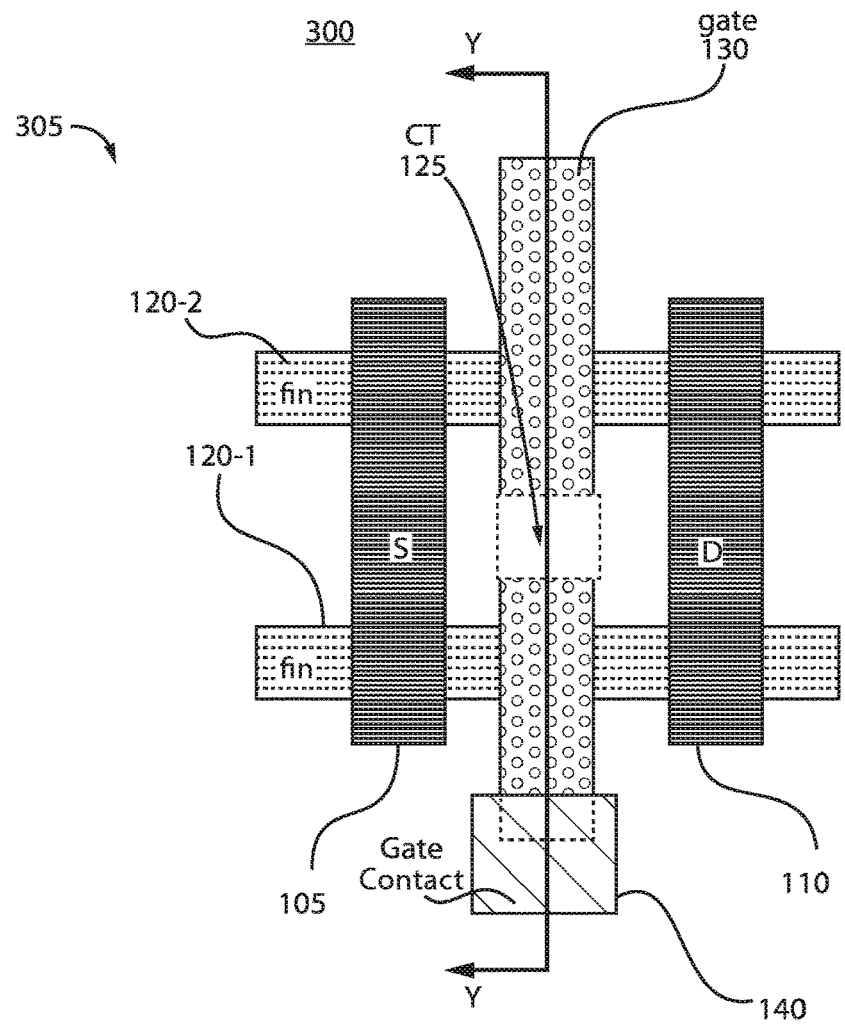
FIG. 3 is a top view and corresponding cross-sectional view of the complete CT FinFET of FIG. 1, in accordance with an embodiment of the present invention.
Figure 3:
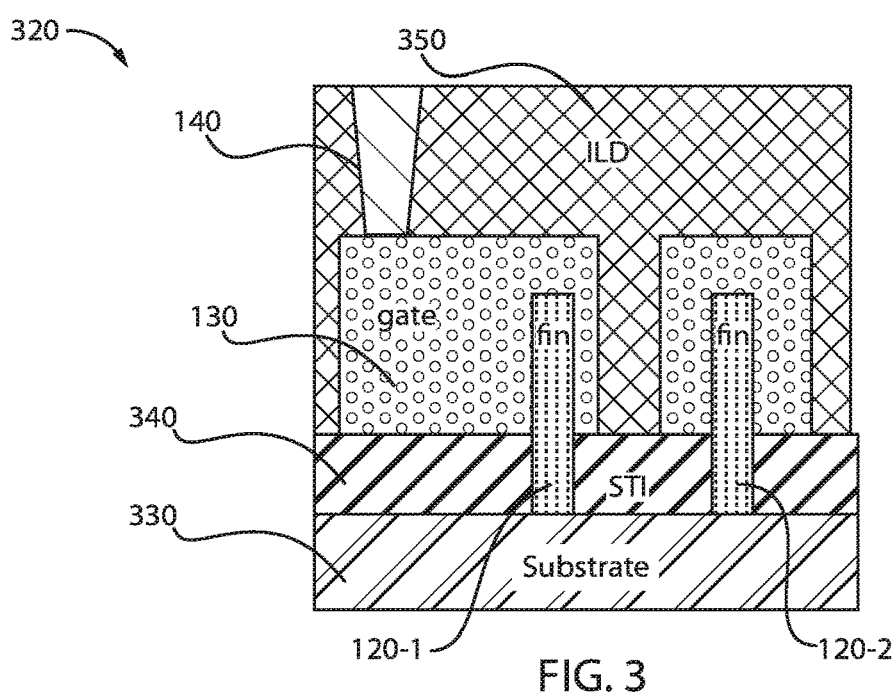

Referring now to FIG. 3, a diagram 300 including a top view 305 and corresponding cross-sectional view 320 of the complete gate cut (CT) FinFET, is shown.

As shown in FIG. 3, cross-sectional view 320 is taken along the axis (fin cross-section Y to Y") 310 (from top view 305). The CT 125 in this instance produces a transistor that corresponds to logic "0": In this instance, the gate cut process results in a complete gate cut.

As shown in the cross sectional view 320, the FinFET includes a substrate 330. A shallow trench isolation (STI) region 340 and a pair of fins 120 (120-1 and 120-2) are positioned on the substrate 330, with a lower region of the fins 120 surrounded by the STI region. Gates 130 are formed over the top of each of the fins 120. A gate contact 140 is formed on the gate 130. A CT area 360 (corresponding to gate cut 125) is formed through the gate 130.

The substrate 330 may comprise a semiconducting material, an insulating material, a conductive material or any combination including multilayers thereof. When the substrate 330 is comprised of a semiconducting material, any semiconductor such as, for example, Si, SiGe, SiGe:C, SiC, Ge alloys, GaAs, InAs, InP and other III/V or II/VI compound semiconductors may be used. In addition to these listed types of semiconducting materials, the present disclosure also contemplates cases in which the semiconductor substrate is a layered semiconductor such as, for example, Si/SiGe, Si/SiC, silicon-on-insulators (SOIs) or silicon germanium-on-insulators (SGOIs). In some embodiments, the semiconducting material may include one or more semiconductor devices formed thereon.

When the substrate 330 is an insulating material, the insulating material can be an organic insulator, an inorganic insulator or a combination thereof including multilayers. When the substrate 330 is a conductive material, the substrate may include, for example, amorphous silicon, polycrystalline silicon, an elemental metal, alloys of elemental metals, a metal silicide, a metal nitride or combinations thereof including multilayers. When the substrate 330 includes a combination of an insulating material and a conductive material, the substrate may represent one of level which can be positioned beneath the electronic structure of the present disclosure.

The shallow trench isolation (STI) region 340 is formed from a dielectric layer (e.g., silicon oxide) or a combination of multiple dielectric materials (e.g., silicon oxide and silicon nitride). The STI region 340 is formed on the substrate 330 to the sides of the pair of fins 120. The pair of fins 120 extend vertically above the level of the STI region and, along this cross section, are enclosed by the gates 130, which are in turn covered (for example, over the top and to the sides) by the ILD 350.

Gate 130 is formed from a dielectric layer that can include any suitable dielectric material, including but not limited to silicon oxide, silicon nitride, silicon oxynitride, high-k materials, or any combination of these materials. Examples of high-k materials include but are not limited to metal oxides such as hafnium oxide, hafnium silicon oxide, hafnium silicon oxynitride, lanthanum oxide, lanthanum aluminum oxide, zirconium oxide, zirconium silicon oxide, zirconium silicon oxynitride, tantalum oxide, titanium oxide, barium strontium titanium oxide, barium titanium oxide, strontium titanium oxide, yttrium oxide, aluminum oxide, lead scandium tantalum oxide, and lead zinc niobate. The high-k may further include dopants such as lanthanum, aluminum, magnesium. The gate dielectric material can be formed by any suitable process or any suitable combination of multiple processes, including but not limited to, thermal oxidation, chemical oxidation, thermal nitridation, plasma oxidation, plasma nitridation, atomic layer deposition (ALD), chemical vapor deposition (CVD), etc. In some embodiments, the gate dielectric has a thickness ranging from 1 nm to 5 nm, although less thickness and greater thickness are also conceived.

The ILD 350 is formed from an interlevel dielectric material, including but not limited to silicon oxide (SiO), silicon nitride (SiN), silicon oxynitride (SiON), silicon carbide (SiC), silicon oxynitride (SiON), carbon-doped silicon oxide (SiOC), silicon-carbon-nitride (SiCN), boron nitride (BN), silicon boron nitride (SiBN), silicoboron carbonitride (SiBCN), silicon oxycabonitride (SiOCN), and combinations thereof. In some embodiments, the ILD 350 includes SiCO, SiCOH, and SiCH compounds; the above-mentioned silicon including materials with some or all of the Si replaced by Ge; carbon-doped oxides; inorganic oxides; inorganic polymers; hybrid polymers; organic polymers such as polyamides or SiLK™; other carbon-containing materials; organo-inorganic materials such as spin-on glasses and silsesquioxane-based materials; and diamond-like carbon (DLC, also known as amorphous hydrogenated carbon, α-C:H).

Figure 4:
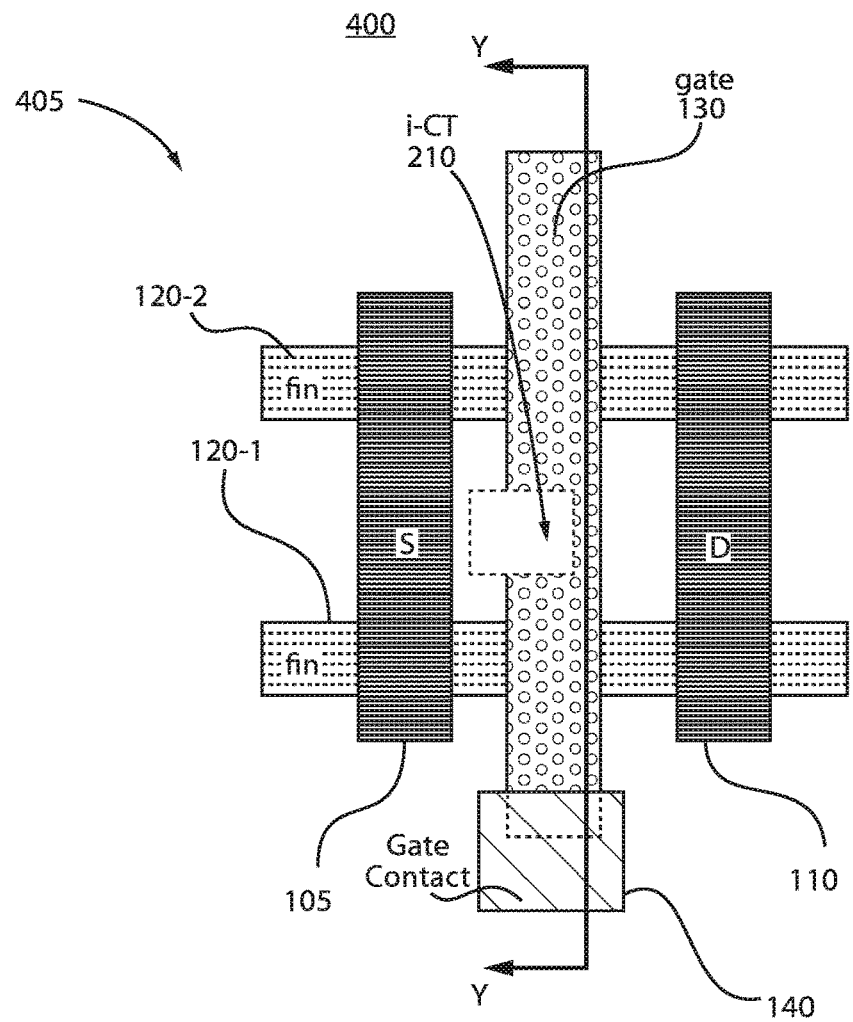
FIG. 4 is a top view and corresponding cross-sectional view of the incomplete CT FinFET of FIG. 2, in accordance with an embodiment of the present invention.
Figure 4:
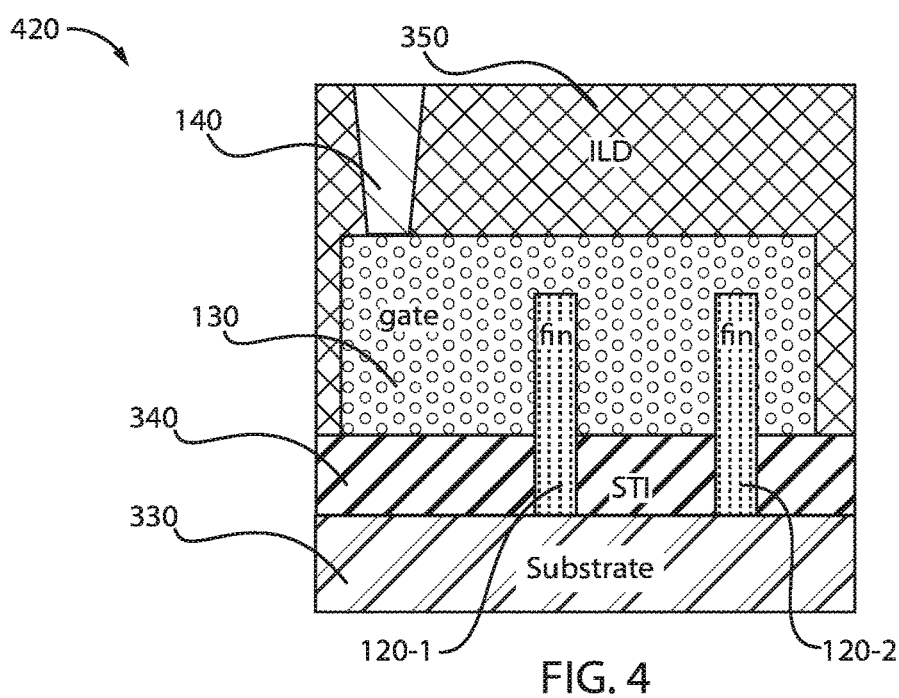

Referring now to FIG. 4, a diagram 400 including a top view 405 and corresponding cross-sectional view 420 with an incomplete gate cut (CT), is shown.

As shown in FIG. 4, cross-sectional view 420 is taken along the axis (fin cross-section Y to Y") 410 (from top view 405). The incomplete gate cut (CT) 210 in this instance produces a transistor that corresponds to logic "1". Accordingly, in contrast to the FinFET with complete gate cut (as shown in FIG. 3 and described herein above) that has the effective drive current from a single fin (logic "0"), the FinFET with incomplete gate cut 210, as shown in FIG. 4, has the effective drive current from two fins 120 (logic "1").

As shown in FIG. 4, the FinFET includes a substrate 330. A STI region 340 and a fin 120 is positioned on the substrate 330. Using FinFET as an example, the security circuit can include an array of FinFETs that collectively form a physically unclonable electrical structures by modulating the continuity and discontinuity of a gate 130 acting on multiple fins 120.

Referring now to FIG. 5, a diagram 500 with top-down views of a FinFET with a complete CT 510 and a FinFET with an incomplete CT 520 and a cross-sectional view in a fin direction of a FinFET 530 corresponding to either instance is shown.

As shown in top down view 510, a cross sectional view 530 of the FinFET is taken along the axis of one of the fins 120 (cross-section X to X") 515. The CT 125 in this instance produces a transistor that corresponds to logic "0".

As shown in top down view 520, a cross sectional view 530 of the gate 130 is taken along the axis (gate cross-section X to X") 525. The CT 125 in this instance produces a transistor that corresponds to logic "1" with incomplete gate cut.

X-X" cross-section 530 is the same for both logic "1" (top down view 520) and "0" (top down view 510).

As shown in the gate cross sectional view 530, the FinFET includes a substrate 330. The lower portion of the fin 120 is formed within STI region 340 on the substrate 330. The source 105 and drain 110 are formed on the fin 120. The gate (including gate dielectric and gate conductor) is formed on and around the fin 120. An interlevel dielectric (ILD) 350 is formed over the source 105 and drain 110 and to the sides of gate 130. The device may further comprise other device structure such as spacers on gate sidewalls (not shown).

Referring now to FIG. 6, an array of fin field-effect transistors (FinFETs) forming multiple bit security code is shown.

As shown, an array of FinFETs (FinFETs 615, representing incomplete cut CT fin (logic "1"), such as described herein above with respect to FIGS. 2, 4 and 5, and FinFETs 620, representing complete gate cut (CT) fin (logic "0"), such as described herein above with respect to FIGS. 1, 3 and 5) can be implemented in a circuit to form a multiple-bit security code. The bolded lines represent FinFETs 615 while regular lines represent FinFETs 620. The FinFETs 615 and 620 are connected to word lines (shown, by way of example, as WL1 (605-1) to WL-m (605-m), where m is a variable greater than 1) and bit lines (shown, by way of example, as BL1 (610-1) to BL-n (610-n), where n is a variable greater than 1) of the circuit 600. An M×N bits security code is generated on chip. For example, to generate a 1024-bit security code, M and N can be 32 (32×32=1024).

The FinFETs can be arranged in an array or other pattern or sequence that can be read to provide a security code. The example embodiments implement a security bit with special gate cut (CT) design such that it results in a random distribution of complete and incomplete gate cut a PUF with a CT 125 throughout the array. Security code bits can implement logic "0" with complete gate cut. Logic "1" can be implemented based on incomplete gate cut. Although a particular arrangement of FinFETs 615 and 620 are shown it should be understood that the pattern is determined at random.

The security features can be determined by measuring drive current, in which complete gate cut results in low drive current (logic "0") because at least one fin is excluded from contributing to the drive current, and incomplete gate cut results in high on-current (logic "1") because all fins contribute to the drive current. By implementing the circuits in accordance with embodiments herein, there are no extra process costs for forming security circuits.

For a FinFET physically comprising two fins, with complete gate cut it has effective drive current from a single fin (logic "0"). In contrast, a FinFET with incomplete gate cut has effective drive current from two fins (logic "1").

Since the process variation is random, by reading the drive current from all FinFET in the security array, a random and unique security code is obtained for reach chip without additional process cost. In one embodiment, the security code is used as the unique chip identifier.

In an example embodiment, by reading the drive current of each FinFET bit of the security array and comparing the drive current with a pre-determined current value (e.g., drive current corresponding to 1.5 fins in the case of 2-fin FinFET devices), the example embodiments can enable users to obtain a series of "1"s and "0"s to form a unique security code.

The drive current can be measured in direct current (DC) mode, the gate resistance due to incomplete gate cut has minimal impact on the DC current. Besides measuring the DC current of each FinFET cell to determine the logic state, users can also measure the alternating current (AC) current at various frequencies to assign the logic state. AC current in these instances depend on the gate resistance (for example, a gate cut amount). In the event that the array is not perfectly random (in other words, the array is partially random), the example embodiments can include redundant bits to compensate the non-ideal randomness. For example, if a 128-bit security code is to be implemented, the example embodiments can include a 256-bit array (16×16). Each of the FinFETs (615 and 620) can be implemented to represent bits in the security code. In instances in which the FinFETs are included on the chip, the values of each FinFET, and accordingly the collective value represented by the bits in total, will be randomly provided based on process variation that stochastically determines either complete or incomplete gate cut for a gate in each multiple fin device (for example, FinFETs (615 and 620)). In other words, in a provided array, none of the bits is predictable and therefore the device cannot be easily replicated.

In accordance with aspects of the present invention, random patterns of values of devices are defined with respect to an arbitrary boundary. The values of devices relative to the boundary provide a pattern or states which can be identified as a unique identifier or PUF. Some embodiments employ the states of materials in these devices to differentiate the device between compliant and non-compliant; however, additional states can also be employed.

The example embodiments can be formed/implemented using device architectures such as described herein above as well as nanowire, nanosheet (replacing fin with nanowire or nanosheet), etc.

Figure 8:
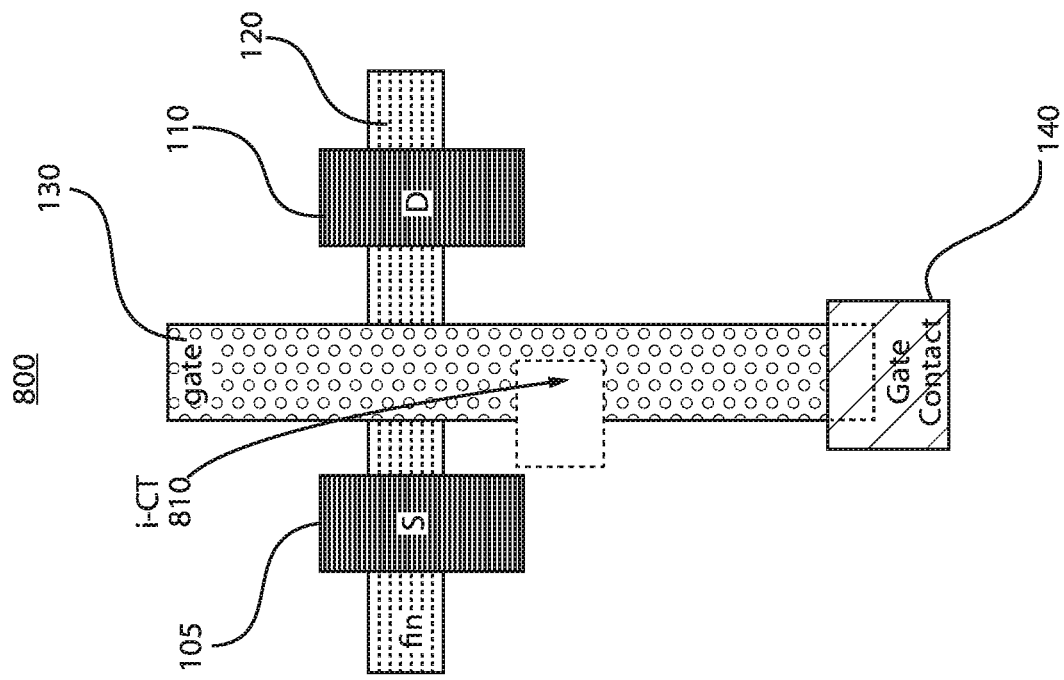
FIG. 8 is a top view showing an incomplete CT FinFET, in accordance with an embodiment of the present invention.
Figure 7:
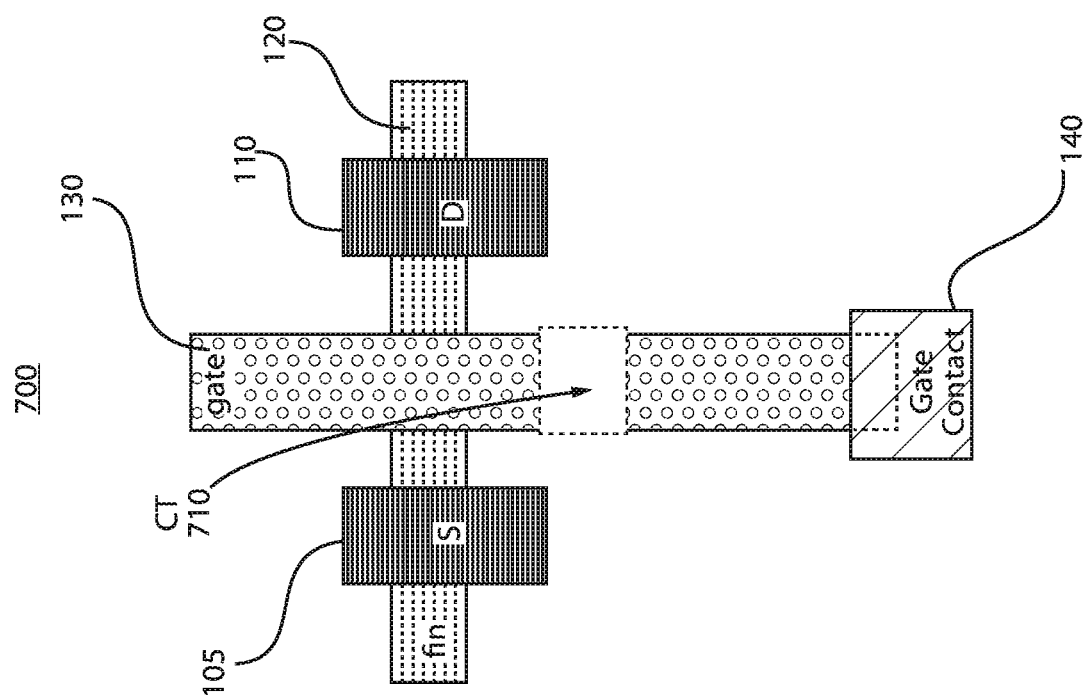
FIG. 7 is a top view showing a complete gate cut (CT) fin field-effect transistor (FinFET), in accordance with an embodiment of the present invention.

Referring now to FIGS. 7-11, example embodiments that include a single fin per bit cell are illustrated. FIG. 7 illustrates a complete CT while FIG. 8 illustrates an incomplete CT for a single fin per bit cell.

Referring now particularly to FIGS. 7 and 8, a top view 700 showing a complete CT for a single fin per bit cell is illustrated in FIG. 7 in accordance with example embodiments. A top view 800 showing an incomplete CT for a single fin per bit cell is illustrated in FIG. 8 in accordance with example embodiments.

As shown in FIG. 7, some devices can include a gate 130 strapped on a fin 120. The device includes a single fin 120. A source (S) 105 and drain (D) 110 are arranged on the fin 120 (on opposite sides of the gate 130). The device with the gate 130 that is cut (710) as shown in FIG. 7 corresponds to Logic "0" with a complete gate cut 710. The gate is cut (CT 710, complete (shown in FIG. 7) or incomplete CT 810, an example of which is shown in FIG. 8) resulting, in some instances, in two segments (FIG. 1). The gate cut is designed such that, depending on the natural process variation in semiconductor manufacturing, the gate cut may (710) or may not (810) be complete.

The example embodiments implement a security bit with special gate cut (CT) design that results in random complete (710, FIG. 7) and incomplete gate cut (810, FIG. 8) of a gate 130 in each of multiple single fin devices. These can implement security code bits with logic "0" with complete gate cut (for example, dead, inoperative FET), as shown in FIG. 7. In this instance, when a voltage is applied to through the gate contact, the voltage does not pass to the gate of the FinFET due to complete gate cut. As a result, the FinFET with a complete gate cut is always off with a drive current substantially close to zero (similar to an inoperative FET).

Logic "1" can be generated from devices with incomplete gate cut (for example, operative FET), as shown in FIG. 8. The incomplete gate cut results in the gate around fin channel being able to receive gate voltage through gate contact. The device in this instance performs as a normal FET.

Figure 9:
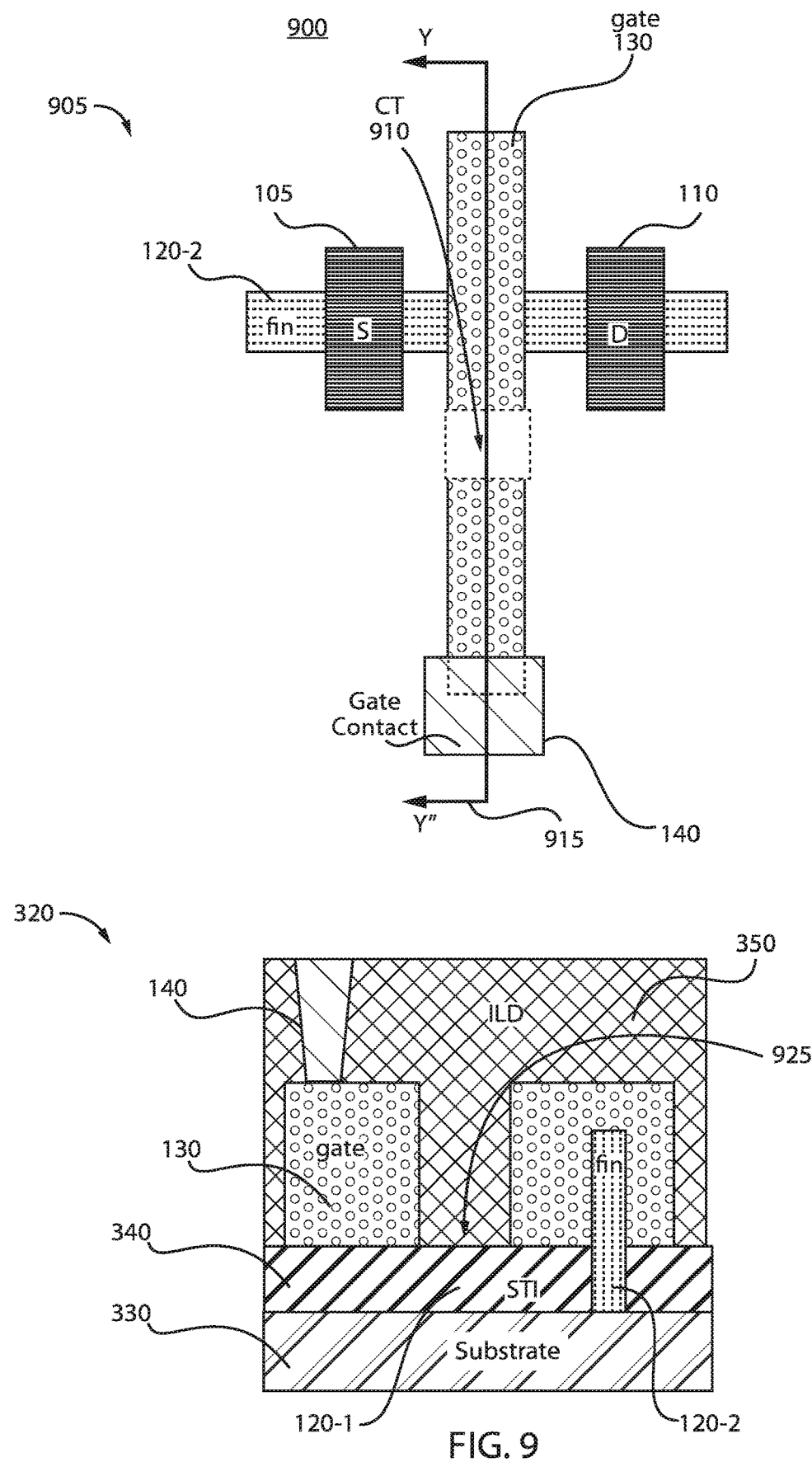
FIG. 9 is a top view and corresponding cross-sectional view of the complete CT FinFET of FIG. 7, in accordance with an embodiment of the present invention.

Referring now to FIG. 9, a diagram 900 including a top view 905 and corresponding cross-sectional view 920 of the complete CT for a single fin per bit cell, such as illustrated in FIG. 7, is shown.

As shown in FIG. 9, cross-sectional view 920 is taken along the longitudinal axis of the gate (cross-section Y to Y") 915 (from top view 905). The CT 910 in this instance produces a transistor that corresponds to logic "0" with a complete gate cut. The FinFET is always off with a drive current substantially close to zero (similar to an inoperative FET).

As shown in the cross sectional view 920, the FinFET includes a substrate 330. A shallow trench isolation (STI) region 340 and fin 120 are positioned on the substrate 330. The fin 120 extends vertically above the STI region 340. A gate 130 is formed over the top of the fin 120 on one side of a gate cut region 925. A gate contact 140 is formed on the gate 130 on the other side of the gate cut (CT) region 925.

An ILD 350 is formed over the device. The device can further comprise other device structures such as spacers on gate sidewalls (not shown).

Figure 10:
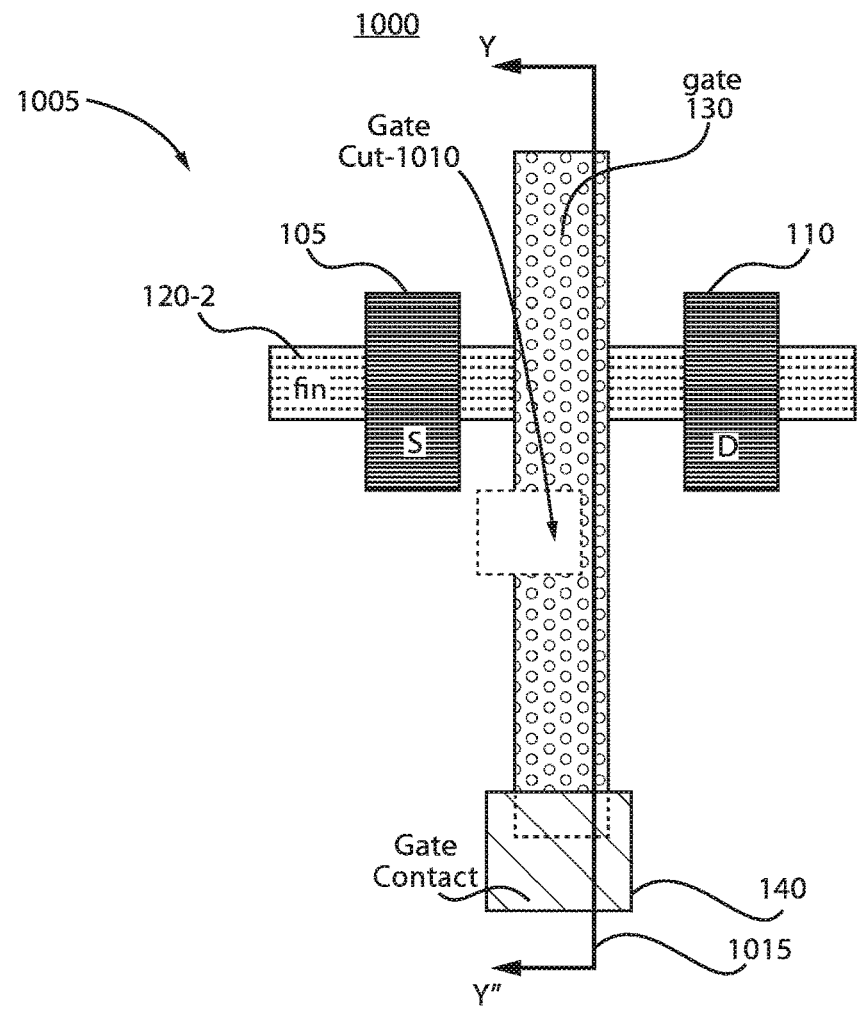
FIG. 10 is a top view and corresponding cross-sectional view of the incomplete CT FinFET of FIG. 8, in accordance with an embodiment of the present invention.
Figure 10:
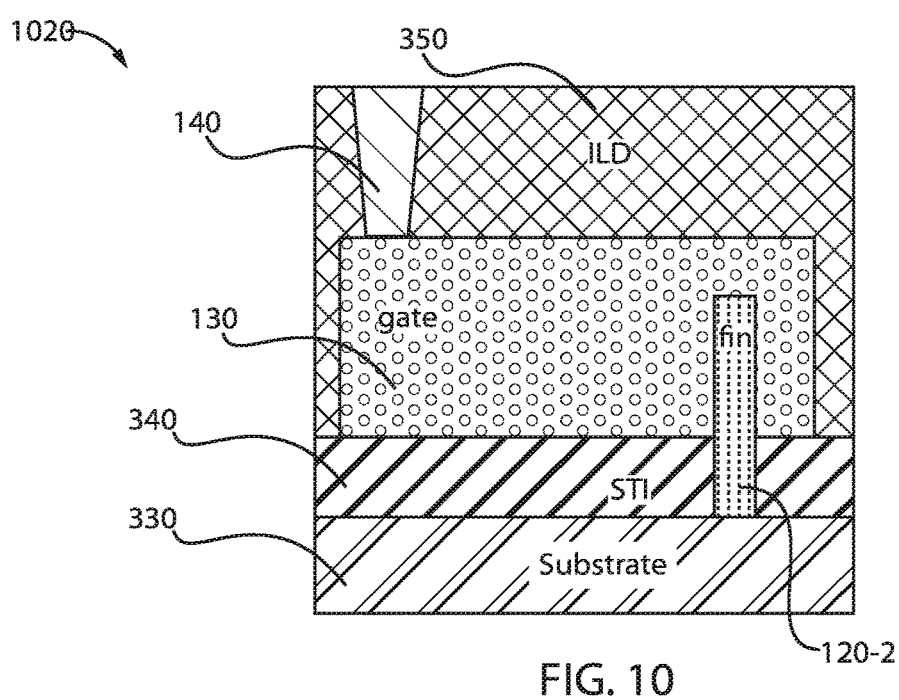

Referring now to FIG. 10, a diagram 1000 including a top view 1005 and corresponding cross-sectional view 1020 with an incomplete gate cut (CT), is shown.

As shown in FIG. 10, cross-sectional view 1020 is taken along the longitudinal axis of the gate (cross-section Y to Y") 1015 (from top view 1005). The incomplete gate cut (CT) 1010 in this instance produces a transistor that corresponds to logic "1" with an incomplete gate cut. In this instance, in contrast to FinFET with complete gate cut (as shown in FIG. 9 and described herein above) that has effectively near-zero drive current (except leakage current) (logic "0"), the FinFET with incomplete gate cut, as shown in FIG. 10, has effectively drive current substantially greater than zero (logic "1"). For example, a logic "0" FinFET may have a drive current close to zero and a logic "1" FinFET may have a drive current that is at least three orders of magnitude higher.

Figure 11:
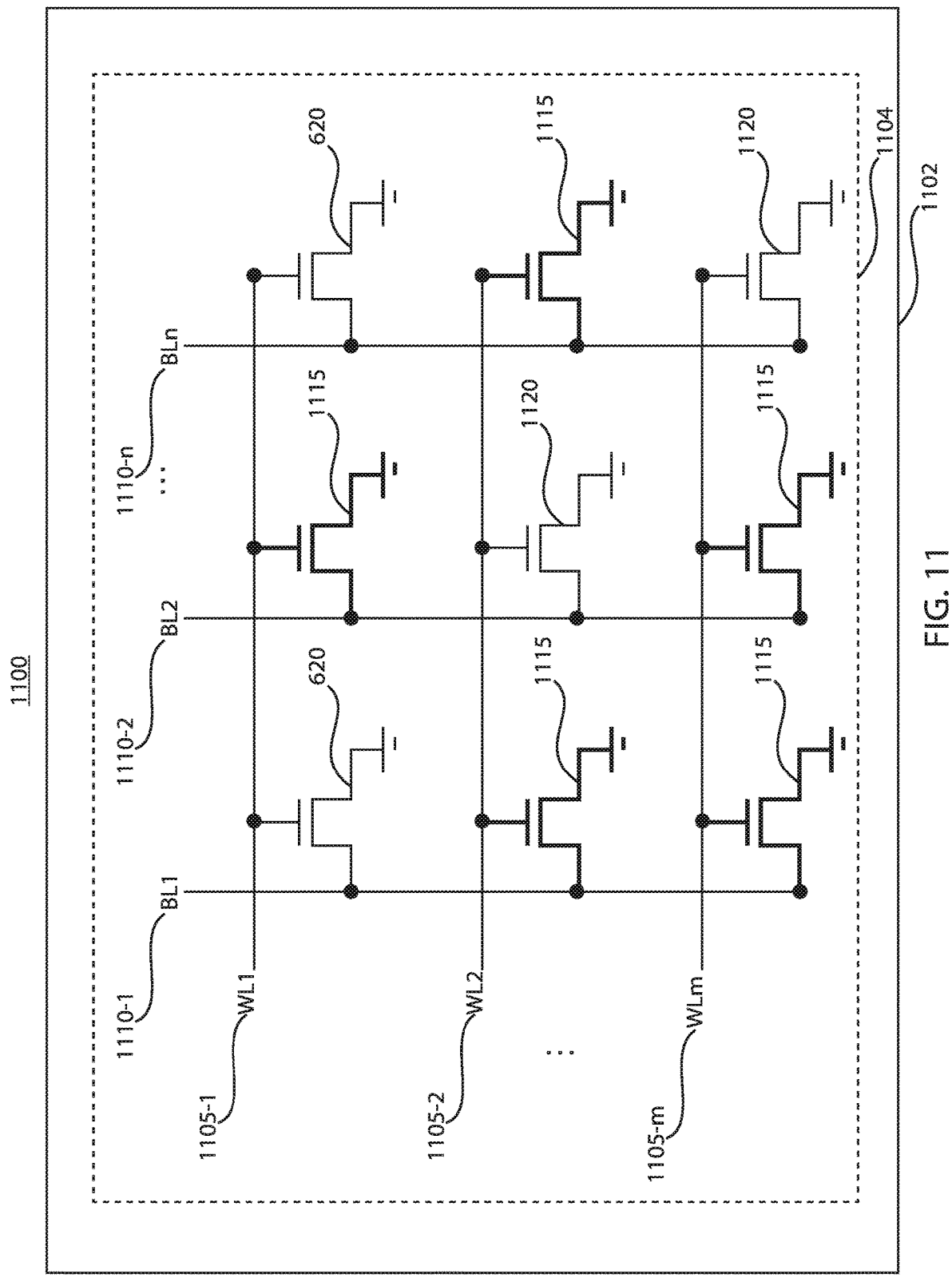
FIG. 11 is a diagram showing another array of fin field-effect transistors (FinFETs) forming a multiple bit security code, in accordance with an embodiment of the present invention.

Referring now to FIG. 11, an array of fin field-effect transistors (FinFETs) forming multiple bit security code is shown.

As shown, an array of FinFETs (1115, representing incomplete cut CT single fin (logic "1") and 1120, representing complete gate cut (CT) single fin (logic "0")) can be implemented in a circuit to form a multiple-bit security code. The FinFETs 1115 and 1120 are connected to word lines (shown, by way of example, as WL1 (1105-1) to WL-m (1105-$m$), where m is a variable greater than 1) and bit lines (shown, by way of example, as BL1 (1110-1) to BL-n (1110-$n$), where n is a variable greater than 1) of the circuit 1100. An M×N bits security code is generated on chip.

The security features can be determined by measuring drive current, in which complete gate cut results in no drive current (logic "0"), and incomplete gate cut results in high on-current (logic "1"). By implementing the circuits in accordance with embodiments herein, there are no extra process costs for forming security circuits.

Besides measuring the DC current of each FinFET cell to determine the logic state, users can also measure the alternating current (AC) current at various frequencies to assign the logic state. AC current in these instances depend on the gate resistance (for example, a gate cut amount).

Figure 12:
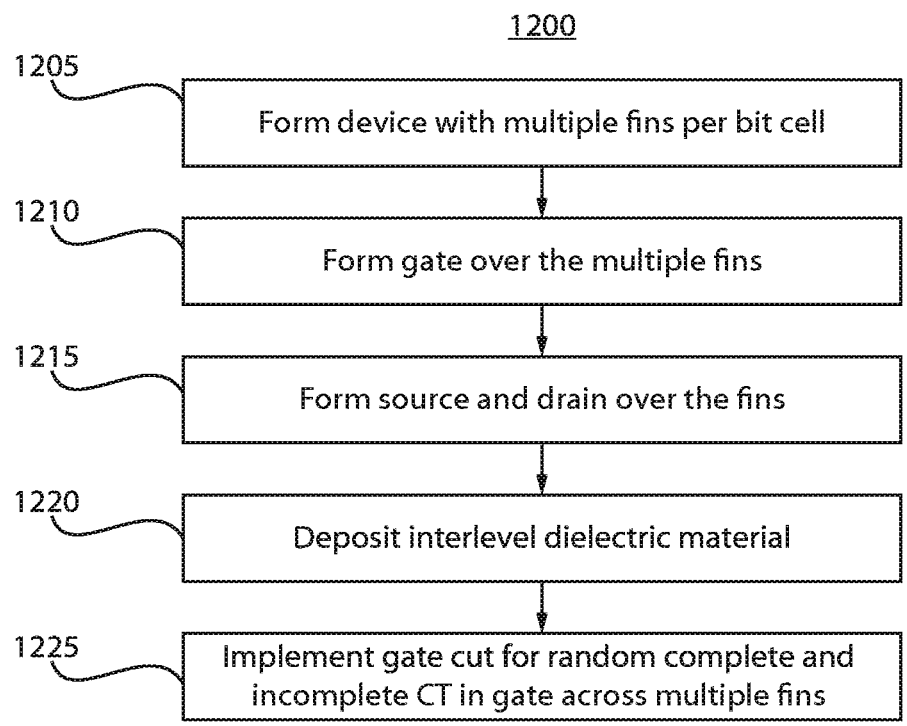
FIG. 12 is a flow diagram showing a method for providing physical unclonable function (PUF) by modulating the continuity and discontinuity of a gate acting on multiple fins, in accordance with an embodiment of the present invention.

Referring now to FIG. 12, a flow diagram of a method for forming physically unclonable electrical structures by modulating the continuity and discontinuity of a gate acting on multiple fins is shown.

The example embodiments can be formed/implemented using device architectures such as described herein above as well as nanowire, nanosheet (replacing fin with nanowire or nanosheet), etc.

At block 1205, a device including FinFETs (for example, a FinFET region) with multiple fins 120 is formed (for example, as shown with respect to FIGS. 1 to 5). For example, a plurality of fin structures 120 may be formed from a bulk semiconductor substrate, using photolithography and etch processes. In one example, a photoresist mask is formed overlying the bulk semiconductor substrate, in which the portion of the bulk semiconductor substrate that is underlying the photoresist mask provides the plurality of fin structures 120. The portion of the bulk semiconductor substrate that is not protected by the photoresist mask is removed using a selective etch process. To provide the photoresist mask, a photoresist layer is first positioned on the bulk semiconductor substrate. The photoresist layer may be provided by a blanket layer of photoresist material that is formed utilizing a deposition process such as, e.g., plasma enhanced chemical vapor deposition (PECVD), evaporation or spin-on coating. The blanket layer of photoresist material is then patterned to provide the photoresist mask utilizing a lithographic process that may include exposing the photoresist material to a pattern of radiation and developing the exposed photoresist material utilizing a resist developer. Following the formation of the photoresist mask, an etching process may remove the unprotected portions of the bulk semiconductor substrate selectively to the photoresist mask. For example, the transferring of the pattern provided by the photoresist into the underlying structures may include an anisotropic etch. As used herein, an "anisotropic etch process" denotes a material removal process in which the etch rate in the direction normal to the surface to be etched is greater than in the direction parallel to the surface to be etched. The anisotropic etch may include reactive-ion etching (RIE). Other examples of anisotropic etching that can be used at this point of the present disclosure include ion beam etching, plasma etching or laser ablation. The etch process may be timed to determine the height of the fin structures 120.

At block 1210, a gate 130 is formed over (connecting) the multiple fins 120 (for each of the bit cells).

At block 1215, the process can include forming a source 105/drain 110. For example, the process can include performing source (S) 105/drain (D) 110 epitaxy. In some embodiments, epitaxy is performed to form S/D. The epitaxial material of the epitaxial source 105 and drain region structures 110 may be composed of a silicon-containing material. Epitaxial materials may be grown from gaseous or liquid precursors. Epitaxial materials may be grown using vapor-phase epitaxy (VPE), molecular-beam epitaxy (MBE), liquid-phase epitaxy (LPE), rapid thermal chemical vapor deposition (RTCVD), metalorganic chemical vapor deposition (MOCVD), ultrahigh vacuum chemical vapor deposition (UHVCVD), low-pressure chemical vapor deposition (LPCVD), limited reaction processing CVD (LRPCVD), or other suitable process. Epitaxial silicon, silicon germanium (SiGe), germanium (Ge), and/or carbon doped silicon (Si:C) silicon can be doped during deposition (in-situ doped) by adding dopants, n-type dopants (e.g., phosphorus or arsenic) or p-type dopants (e.g., boron or gallium), depending on the type of transistor. The dopant concentration in the source/drain can range from $1\times10^{19}$ cm$^{-3}$ to $3\times10^{21}$ cm$^{-3}$, or in some instances between $2\times10^{20}$ cm$^{-3}$ to $3\times10^{21}$ cm$^{-3}$. Other doping techniques can be used to incorporate dopants in the bottom source/drain region. Dopant techniques include but are not limited to, ion implantation, gas phase doping, plasma doping, plasma immersion ion implantation, cluster doping, infusion doping, liquid phase doping, solid phase doping, in-situ epitaxy growth, or any suitable combination of those techniques.

At block 1220, the process can include depositing interlevel dielectric material (for example, ILD 350, as shown in FIG. 3). The interlevel dielectric material may be deposited using at least one of spinning from solution, spraying from solution, chemical vapor deposition (CVD), PECVD, sputter deposition, reactive sputter deposition, ion-beam deposition, and evaporation. Following deposition of the interlevel dielectric material, a planarization processes is conducted so that the upper surface of the interlevel dielectric material is coplanar with the upper surface of the sacrificial gate cap. The planarization of the interlevel dielectric material may be provided by chemical mechanical planarization.

At block 1225, the process can include implementing a gate cut (CT) design that results in random complete and incomplete gate cut at the device level. For example, the process can include dummy gate cut (CT) and fill and dummy gate removal over the multiple fins 120 per bit cell. The process can create physically unclonable electrical structures using a gate cut that is designed such as, depending on the natural process variation in semiconductor manufacturing, the gate cut may or may not be complete. This is achieved through a CT design that pushes the boundary of normal fabrication variation such that it results in random complete and incomplete gate cut at the device level.

The sacrificial gate structure may then be removed using an etch process. For example, the dummy gate may be removed by an etch chemistry that removes the material of the sacrificial gate cap, e.g., silicon nitride, selectively to the material of the underlying sacrificial gate structure, e.g., polysilicon. The etch process may also be selective to the interlevel dielectric material 350. In some embodiments, the sacrificial gate structure may be removed by an etch process that is selective to the interlevel dielectric material 350, the gate sidewall spacers and the fin structure 120. The etch process may include at least one of reactive ion etch, plasma etching and wet chemical etching. Thereafter, a functional gate structure is formed.

The resulting structure can include an array of FinFETs as described with respect to FIG. 6 and preceding FIGS. These FinFETs can form a random and yet unique series of logic "1" and "0" states. The logic states are randomly determined in each of the FinFETs based on process variation during formation of the FinFETs.

Logic "0": Precise process results in complete gate cut.

Logic "1": Non-ideal process results in incomplete gate cut.

In accordance with the example embodiments, the processes and structures determine physically unclonable electrical structures by modulating the continuity and discontinuity of a gate acting on multiple fins.

Since the process variation is random, by reading the drive current from all FinFET in the security array, a random and unique security code is obtained for reach chip without additional process cost. In one embodiment, the security code is used as the unique chip identifier.

Figure 13:
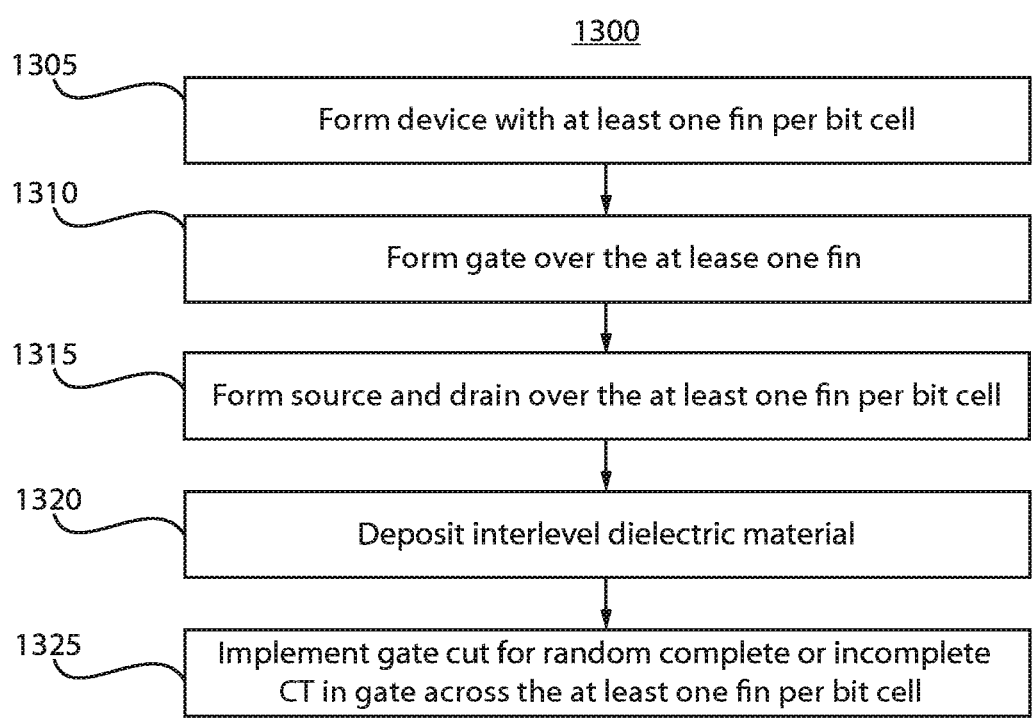
FIG. 13 is a flow diagram of a method for forming physically unclonable electrical structures by modulating the continuity and discontinuity of a gate acting on at least one fin in accordance with an embodiment of the present invention.

Referring now to FIG. 13, a flow diagram of a method for forming physically unclonable electrical structures by modulating the continuity and discontinuity of a gate acting on at least one fin is shown.

The example embodiments can be formed/implemented using device architectures such as described herein above as well as nanowire, nanosheet (replacing fin with nanowire or nanosheet), etc. The example embodiments fabricated by this process generate logic states ("0" or "1) (for example, for each bit cell). In some embodiments, the fabricated devices can include more than one fin. Logic "0" bits are generated from devices with complete gate cut (near-zero drive current). Logic "1" bits are generated from devices with incomplete gate cut (much higher drive current than that of logic "0" devices).

At block 1305, a device including FinFETs (for example, a FinFET region) with at least one fin (shown, by way of illustration, as a single fin) 120 for each bit cell is formed (for example, as shown and described with respect to FIGS. 7 to 11). For example, a plurality of fin structures 120 may be formed from a bulk semiconductor substrate, using photolithography and etch processes.

At block 1310, a gate 130 is formed over (connecting) the at least one fin 120 (for each of the bit cells).

At block 1315, the process can include forming a source 105 and drain over each fin 120 per bit cell. For example, the process can include performing source (S) 105/drain (D) 110 epitaxy. In some embodiments, the epitaxial material of the epitaxial source 105 and drain region structures 110 may be composed of a silicon-containing material.

At block 1320, the process can include depositing interlevel dielectric material (for example, ILD 350, as shown in FIG. 9). The interlevel dielectric material may be deposited using at least one of spinning from solution, spraying from solution, chemical vapor deposition (CVD), PECVD, sputter deposition, reactive sputter deposition, ion-beam deposition, and evaporation.

At block 1325, the process can include implementing a gate cut (CT) design that results in random complete and incomplete gate cut at the device level. For example, the process can include dummy gate cut (CT) and fill. The process can create physically unclonable electrical structures using a gate cut that is designed such as, depending on the natural process variation in semiconductor manufacturing, the gate cut may or may not be complete.

The sacrificial gate structure may then be removed using an etch process. For example, the dummy gate may be removed by an etch chemistry that removes the material of the sacrificial gate cap, e.g., silicon nitride, selectively to the material of the underlying sacrificial gate structure, e.g., polysilicon. The etch process may also be selective to the interlevel dielectric material 350.

The resulting structure can include an array of FinFETs as described with respect to FIGS. 7 to 11. These FinFETs can form a random and yet unique series of logic "1" and "0" states.

Logic "0": results from a complete gate cut.
Logic "1": results from an incomplete gate cut.

In accordance with the example embodiments, the processes and structures determine physically unclonable electrical structures by modulating the continuity and discontinuity of a gate acting on fins within each bit cell.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A design for an integrated circuit chip in accordance with embodiments of the present invention may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Having described preferred embodiments of a system and method for implementing chips with physical unclonable function (PUF) by variation of gate work function on Fin channel sidewalls (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A semiconductor chip comprising:
    a substrate;
    a plurality of devices formed on the substrate, each device including at least two fins; and
    a gate formed on the at least two fins with a gate cut (CT) design that results in random distribution of complete gate cut and incomplete gate cut for each of the devices in the plurality of devices based on a natural process variation in semiconductor manufacturing for each device, wherein a physical unclonable function (PUF) region is defined in accordance with the random distribution.

2. The semiconductor chip of claim 1, wherein the plurality of devices include:
    at least one fin field-effect transistor (FinFET) with complete gate cut that has a lower effective drive current corresponding to logic "0"; and
    at least one FinFET with incomplete gate cut that has a higher effective drive current corresponding to logic "1".

3. The semiconductor chip of claim 1, wherein the semiconductor chip is configured to be read to identify a random security code based on drive current from all the devices in the plurality of devices.

4. The semiconductor chip of claim 3, wherein the random security code is configured as a unique chip identifier.

5. The semiconductor chip of claim 1, wherein the plurality of devices is configured to be read based on a drive current and compared with a pre-determined current value.

6. The semiconductor chip of claim 5, wherein the drive current is measured in direct current (DC) mode.

7. The semiconductor chip of claim 1, wherein the plurality of devices is not perfectly random, further comprising:
    redundant bits to compensate for non-ideal randomness.

8. The semiconductor chip of claim 1, wherein the plurality of devices is based on one of a fin field-effect transistor (FinFET), nanowire field-effect transistor (FET), and a nanosheet FET.

9. The semiconductor chip of claim 1, wherein the at least two fins have shared contacts for source and drain.

10. A semiconductor chip comprising:
    a substrate;
    a plurality of devices formed on the substrate, each device including at least one fin; and
    a gate formed on the at least one fin with a gate cut (CT) design that results in random distribution of complete gate cut and incomplete gate cut for each of the devices in the plurality of devices based on a natural process variation in semiconductor manufacturing for each device, wherein a physical unclonable function (PUF) region is defined in accordance with the random distribution, wherein the plurality of devices include:
    at least one fin field-effect transistor (FinFET) with complete gate cut that is inoperative corresponding to logic "0"; and
    at least one FinFET with incomplete gate cut that has effective drive current from at least one fin corresponding to logic "1".

11. The semiconductor p of claim 10, wherein the at least one fin comprises a single fin.

12. The semiconductor chip of claim 10, wherein the semiconductor chip is configured to be read to identify a random security code based on drive current from all the devices in the plurality of devices.

13. The semiconductor chip of claim 12, wherein the random security code is configured as a unique chip identifier.

14. The semiconductor chip of claim 10, wherein the plurality of devices is configured to be read based on a drive current and compared with a pre-determined current value.

15. The semiconductor chip of claim 14, wherein the drive current is measured in direct current (DC) mode.

16. The semiconductor chip of claim 10, wherein the plurality array of devices are not perfectly random, further comprising:
    redundant bits to compensate for non-ideal randomness.

17. A method of forming a semiconductor structure with a physical unclonable function (PUF), the method comprising:

forming a device with at least one fin per bit cell;
forming a gate over the at least one fin;
forming a source and drain over the at least one fin; and
performing a gate cut process for random complete and incomplete gate cut across each gate across the at least one fin.

18. The method of claim 17, wherein the at least one fin comprises a single fin.

19. The method of claim 17, wherein the at least one fin comprises multiple fins.

20. The method of claim 19, further comprising:
forming a shared gate contact for source and drain for the multiple fins in each bit cell.

* * * * *